United States Patent
Ruda (10) Patent No.: US 9,700,915 B2
(45) Date of Patent: Jul. 11, 2017

(54) METHOD FOR PRODUCTION OF SUPERHYDROPHOBIC SURFACES

(75) Inventor: Marcus Ruda, Bandhagen (SE)

(73) Assignee: CELLUTECH AB, Stockholm (SE)

( * ) Notice: Subject to any disclaimer, the term of this patent is extended or adjusted under 35 U.S.C. 154(b) by 964 days.

(21) Appl. No.: 13/993,924

(22) PCT Filed: Dec. 16, 2011

(86) PCT No.: PCT/SE2011/051532
§ 371 (c)(1),
(2), (4) Date: Aug. 29, 2013

(87) PCT Pub. No.: WO2012/082068
PCT Pub. Date: Jun. 21, 2012

(65) Prior Publication Data
US 2013/0330543 A1 Dec. 12, 2013

Related U.S. Application Data

(60) Provisional application No. 61/424,183, filed on Dec. 17, 2010.

(30) Foreign Application Priority Data

Dec. 17, 2010 (SE) ...................................... 1051341

(51) Int. Cl.
| | |
|---|---|
| *B05D 5/00* | (2006.01) |
| *C09D 5/00* | (2006.01) |
| *C09D 7/00* | (2006.01) |
| *C09D 7/12* | (2006.01) |
| *C09K 3/18* | (2006.01) |
| *B05D 1/02* | (2006.01) |
| *B05D 5/08* | (2006.01) |

(52) U.S. Cl.
CPC .............. *B05D 5/00* (2013.01); *C09D 5/00* (2013.01); *C09D 7/001* (2013.01); *C09D 7/1233* (2013.01);
(Continued)

(58) Field of Classification Search
None
See application file for complete search history.

(56) References Cited

U.S. PATENT DOCUMENTS

| | | | |
|---|---|---|---|
| 2,835,578 A * | 5/1958 | Griffin ................... | G03C 1/775 |
| | | | 430/538 |
| 5,013,775 A | 5/1991 | Oikawa et al. | |

(Continued)

FOREIGN PATENT DOCUMENTS

| | | |
|---|---|---|
| CN | 1406297 A | 3/2003 |
| CN | 1507405 A | 6/2004 |

(Continued)

OTHER PUBLICATIONS

Torkkeli, A. et al. "Electrostatic Transportation of Water Droplets on Superhydrophobic Surfaces" *Micro Electro Mechanical Systems*, Jan. 25, 2001, The 14th IEEE International Conference, pp. 475-478.
(Continued)

*Primary Examiner* — Nathan T Leong
(74) *Attorney, Agent, or Firm* — Saliwanchik, Lloyd & Eisenschenk (57) ABSTRACT

The present invention provides a method for the production of a superhydrophobic film, surface or material comprising the steps of: (i) providing a composition comprising a hydrophobic substance and a hydrophilic solvent, the hydrophilic solvent being a liquid at a temperature of 25° C. and atmospheric pressure; and (ii) spraying the composition towards a substrate for deposition of a solid residue onto the surface of the substrate for generation of the superhydrophobic film, surface or material; wherein the temperature of the composition is higher that the temperature of the substrate when carrying out step (ii). A composition, use of the composition and a substrate is also provided.

13 Claims, 4 Drawing Sheets

(52) U.S. Cl.
CPC .................. *C09K 3/18* (2013.01); *B05D 1/02* (2013.01); *B05D 5/08* (2013.01); *B05D 2203/22* (2013.01); *Y10T 428/273* (2015.01)

(56) References Cited

U.S. PATENT DOCUMENTS

| | | | | |
|---|---|---|---|---|
| 5,071,675 | A | * | 12/1991 | Gupta ..................... D21H 3/04 162/169 |
| 2003/0092804 | A1 | | 5/2003 | Detering et al. |
| 2005/0118433 | A1 | | 6/2005 | Oles et al. |
| 2007/0173579 | A1 | * | 7/2007 | Gerstenhaber .......... C07C 45/89 524/356 |

FOREIGN PATENT DOCUMENTS

| | | |
|---|---|---|
| JP | H01280096 A | 11/1989 |
| JP | H08092499 A | 4/1996 |
| WO | WO-90/11141 A1 | 10/1990 |
| WO | WO-01/85800 A2 | 11/2001 |
| WO | WO-02/090206 A1 | 11/2002 |
| WO | WO-02/090653 A2 | 11/2002 |
| WO | WO-2009/005465 A1 | 1/2009 |
| WO | WO-2009/074321 A1 | 6/2009 |

OTHER PUBLICATIONS

Zhang, X. et al. "Superhydrophobic surfaces: from structural control to functional application" *Journal of Materials Chemistry*, Feb. 14, 2008, 18(6):621-633.

Li, X.M. et al. "What do we need for a superhydrophobic surface? A review on the recent progress in the preparation of superhydrophobic surfaces" *Chemical Society Reviews*, Aug. 2007, 36(8):1350-1368.

Roach, P. et al. "Progress in superhydrophobic surface development" *Soft Matter*, Feb. 7, 2008, 4(2):224-240.

Murai, K. et al. "Reaction of higher alkyl ketene dimers with alcohols", HCAPLUS AN 1962:442476.

Yoshida, Y. et al. "Thermal and liquid crystalline properties of cellulose β-ketoesters prepared by homogenous reaction with ketene dimers" *Cellulose*, Dec. 2006, 13(6):637-645.

Werner, O. et al. "Properties of superhydrophobic paper treated with rapid expansion of supercritical $CO_2$ containing a crystallizing wax" *Cellulose*, Feb. 2010, 17(1):187-198.

Quan, C. et al. "Generation of superhydrophobic paper surfaces by a rapidly expanding supercritical carbon dioxide—alkyl ketene dimer solution" *The Journal of Supercritical Fluids*, May 2009, 49(1):117-124.

Torkkeli, A. "Droplet microfluidics on a planar surface" *Dissertation thesis*, 2008, pp. 1-213.

Bradbury, J. E. "AKD Sizing Reversion: The Vapor Phase Adsorption of the Thermal Decomposition Products of Alkyl Ketene Dimer Onto Cellulose Substrates" *Dissertation thesis*, 1997, pp. 1-262.

International Search Report in International Application No. PCT/SE2011/051532, filed Dec. 16, 2011.

Shibuichi et al. Super Water-Repellent Surfaces Resulting From Fractal Structure. *The Journal of Physical Chemistry*, 100(50), 19512-19517. ACS Publications. United States of America.

Office Action dated Apr. 3, 2015 in Chinese Application No. 201180060343.1, filed Dec. 16, 2011.

Shibuichi, S., et al., "Super Water-Repellent Surfaces Resulting from Fractal Structure," The Journal of Physical Chemistry, Dec. 12, 1996, pp. 19512-19, 517; vol. 100. 50.

* cited by examiner

METHOD FOR PRODUCTION OF SUPERHYDROPHOBIC SURFACES

CROSS-REFERENCE TO RELATED APPLICATIONS

This application is the U.S. national stage application of International Patent Application No. PCT/SE2011/051532, filed Dec. 16, 2011, which claims priority to Swedish Application No. 1051341-4, filed Dec. 17, 2010, and U.S. Application No. 61/424,183, filed Dec. 17, 2010, the disclosures of each of which are incorporated herein by reference in their entirety.

TECHNICAL FIELD

The present invention relates to a process for production of superhydrophobic surfaces by spraying a composition comprising a hydrophobic material onto a surface.

BACKGROUND

In certain technological processes and fabrication procedures, as well as in many every-day situations, it is of crucial importance to utilize objects with strongly water repellent and/or self cleaning surfaces that are stable enough to retain the water-repellent and/or self cleaning property even after water exposure.

The water repellant ability of a surface is positively correlated to the hydrophobicity and the degree of unevenness on a colloidal length scale, i.e. about $10^{-8}$-$10^{-5}$ m, thereof. A highly water repellant surface is resulting when the actual contact surface with water, on the microscopic scale, is much larger than the projected macroscopic surface. Hydrophobic surfaces with a suitable microscopic geometry may be highly water repellant as indicated by a contact angle toward pure water in the range between about 150 and 180 degrees. Such surfaces are commonly denoted superhydrophobic surfaces. A well-known example taken from nature itself is the leaf of the lotus plant (*Nelumbo nucifera*). A superhydrophobic surface is, as a rule, "self-cleaning" which means that particles of dust and dirt which at first adhere to the surface are being transferred to water droplets sprinkled onto the surface and then removed when the droplets roll off the surface.

Much effort has been devoted to the application of waxes and similar hydrophobic materials, e.g. alkylketenedimer (AKD), onto various surfaces for rendering these water repellant and, occasionally, even superhydrophobic.

Torkkeli et al., Micro Electro Mechanical Systems, 2001, pp 475-478, describes a method for rendering the surface of an electric insulator superhydrophobic by spraying a chloroform solution of AKD onto the same. Disadvantages of this method include a low reproducibility and a high toxicity of the chloroform employed. Chloroform is e.g. generally considered as carcinogenic and is associated with a negative environmental impact. Furthermore, the use of chloroform as solvent limits the spraying device employed to only such spraying devices in which contacting parts, e.g. gaskets and other polymeric materials, are not unacceptably affected by chloroform, which is a solvent with a high dissolution capability for many polymeric materials and/or which may cause such to swell.

WO2009005465A1 describes a method for the preparation of a superhydrophobic surface by expansion of a pressurized fluid in which a hydrophobic substance is dissolved. The substance crystallize/precipitate after expansion whereby particles are formed and deposited to form a superhydrophobic surface. Disadvantages of this method include the need of equipment capable of storing and handling pressurized solutions. Furthermore, the solubility of the hydrophobic substance in the pressurized solvent, typically supercritical $CO_2$, is relatively low. Hence, a relatively large volume of pressurized solvent is needed for the deposition of a relatively small amount of hydrophobic substance.

Hence, improved methods for the production of superhydrophobic surfaces are highly desired.

SUMMARY

The present invention seeks to mitigate, alleviate, circumvent or eliminate at least one, such as one or more, of the above-identified deficiencies.

According to one aspect of the invention, there is provided a method for the production of a superhydrophobic film, surface or material comprising the steps of: (i) providing a composition comprising a hydrophobic substance and a hydrophilic solvent, the hydrophilic solvent being a liquid at a temperature of 25° C. and atmospheric pressure; and (ii) spraying the composition towards a substrate for deposition of a solid residue onto the surface of the substrate for generation of the superhydrophobic film, surface or material; wherein the temperature of the composition is higher that the temperature of the substrate when carrying out step (ii).

According to another aspect of the invention, there is provided a superhydrophobic film, surface or material obtainable by the method according to the invention.

According to yet another aspect of the invention, there is provided a substrate comprising a superhydrophobic film, surface or material according to the invention.

According to yet another aspect of the invention, there is provided a composition comprising alkylketenedimer and HOC1-8 alkyl or a mixture of different HOC1-8 alkyls, wherein the concentration of the alkylketenedimer in the composition may be at least 1 mg/ml; for use in the production of a superhydrophobic film, surface or material.

According to yet another aspect of the invention, there is provided use of a composition according to the invention for the production of a superhydrophobic film, surface or material.

Further, advantageous features of various embodiments of the invention are defined in the dependent claims and within the detailed description below.

BRIEF DESCRIPTION OF THE DRAWINGS

These and other aspects, features and advantages of which the invention is capable of will be apparent and elucidated from the following description of non-limiting embodiments of the present invention, reference being made to the accompanying figures, in which.

DETAILED DESCRIPTION

Definitions

The terms "room temperature" and "ambient temperature" shall mean, unless otherwise specified, a temperature between 16 and 25° C.

As used herein, "roll off angle" refers to the angle which a solid flat, horizontal arranged surface has to be tilted, in relation to a horizontal plane, in order for a droplet of a given liquid and of given size, e.g. 20 µl of water, deposited on the surface to start sliding or rolling.

As used herein, "alkyl" used alone or as a suffix or prefix, is intended to include both branched and straight chain saturated aliphatic hydrocarbon groups having from 1 to 23 carbon atoms or if a specified number of carbon atoms is provided then that specific number is intended. For example "C1-6 alkyl" denotes alkyl having 1, 2, 3, 4, 5 or 6 carbon atoms. Examples of alkyl include, but are not limited to, methyl, ethyl, n-propyl, i-propyl, n-butyl, butyl, sec-butyl and t-butyl.

As used herein, "alkenyl" used alone or as a suffix or prefix, is intended to include both branched and straight chain unsaturated olefinic hydrocarbon groups having from 2 to 23 carbon atoms and from 1 to 4 double bonds that may, independently, be either Z or E. For example "C2-6 alkenyl" denotes alkenyl having 2, 3, 4, 5 or 6 carbon atoms. Examples of alkenyl include, but are not limited to, vinyl, allyl and oct-4-en-2-yl.

As used herein, "fluoroalkyl" used alone or as a suffix or prefix, refers to groups in which one, two, three or more of the hydrogen(s) attached to any of the carbons of the corresponding alkyl-group are replaced by fluoro.

Embodiments

A superhydrophobic film, surface or material may be prepared by a method provided herein comprising two steps (i and ii). In the first step (i), a composition comprising a hydrophobic substance and a hydrophilic solvent is provided. The hydrophilic solvent may be a liquid at ambient temperature and pressure, e.g. at a temperature of 25° C. and atmospheric pressure. In the second step (ii) the composition, e.g. a homogenous solution, may be sprayed towards a substrate for deposition of a solid residue onto the surface of the substrate for generation of the superhydrophobic film, surface or material. The temperature of the composition may be higher that the temperature of the substrate when carrying out the second step.

It was surprisingly found that hot solutions of a hydrophobic substance, e.g. alkylketenedimer (AKD) comprising long chain straight alkyl chains, in hydrophilic solvents, e.g. alcohols, such as HOC1-8 alkyl, provide superhydrophobic surfaces when sprayed onto various substrates having a lower temperature. The superhydrophobic film, surface or material produced by the method disclosed herein has, on the microscopic scale, the appearance of a mountain landscape with deep valleys and rounded mountain peaks on e.g. Whatman no. 1 filter paper as substrate. Its appearance may also be described as resembling pieces of cauliflower with a flaky surface randomly placed next to each other or on top of each other, with the stem-side facing away from the viewer. Use of hydrophobic solvents, e.g. chloroform, according to methods of the prior art, results in a landscape that is more flat. Furthermore, measurables indicative of superhydrophobic properties, e.g. the roll off angle, are more in line with a true superhydrophobic surface when produced by the method disclosed herein as compared to this method of the prior art.

Without being bound to any theory, the present inventor believes that the high difference in solubility of the hydrophobic substance in the hydrophilic solvent when lowering the temperature is causing the hydrophobic substance to crystallize in a crystalline form which is beneficial for the formation of a superhydrophobic surface.

Without being bound to any theory, the present inventor further believes that a part of the hydrophobic substance may react with the hydrophilic solvent to form a reaction product which may exist in trace amounts or more in the final superhydrophobic surface and/or hot solution. The reaction product may thus exist in amount of 0.01 to 50 wt %, such as 0.1 to 10 wt % or 0.5 to 5 wt %, of the total amount of the hydrophobic substance in the composition of the invention or in the superhydrophobic film, surface or material of the invention. This reaction product may be beneficial in the formation, e.g. crystallization, of the superhydrophobic film, surface or material according to the invention. Examples of such reaction products include ester (Ia) and ketone (Ib), depicted below, which may be formed by nucleophilic ring opening by an aliphatic alcohol, such as methanol, ethanol or i-propanol, of alkylketenedimer (AKD) of formula (I), wherein R1 and R2 may be, for example, straight chain C16 or C14 alkyl, followed by hydrolysis and decarboxylation, as depicted below. Hence, "alkyl" as depicted below may be, for example, methyl, ethyl or i-propyl.

Hydrophobic substances of the invention, which may be solids at 25° C., include compounds and mixtures of compounds that are practically insoluble in water. Such compounds may, for example have an aqueous solubility of less than 1 mg/L, such as less than 0.5 or less than 0.1 mg/L, at 25° C. Examples of such hydrophobic substances include natural and synthetic waxes, natural and synthetic compounds containing long aliphatic or olefinic carbon chains, such as commercially available alkylketenedimer (AKD) or long chain carboxylic acids or amides comprising at least 18 carbon atoms, triglycerides that are solid at room temperature and long chain hydrocarbons or ketones. Additional examples of hydrophobic substances of the invention include fluorinated compounds, such as any of the before mentioned substances wherein one or several hydrogen atoms, such as 1 to 10, have been replaced by fluoro.

Hydrophilic solvents of the invention, which may be liquids at room temperature and ambient pressure, include compounds and mixtures of compounds that are either fully miscible with water in any proportion or aliphatic alcohols comprising 1 to 8 carbon atoms.

According to one embodiment, the hydrophobic substance may be a compound of formula (I)

(I)

R1 and R2 of a compound of formula (I) may be independently selected from C12-22 alkyl, such as C14 or C16 alkyl, and C12-22 fluoroalkyl. The stereochemistry of the double bond connecting R1 to the four membered ring of a compound of formula (I) may be E or Z.

According to one embodiment, the hydrophobic substance may be a mixture of compounds of formula (I). In such a mixture, R1 and R2 of one of the compounds of formula (I) may be straight chain C14 alkyl and R1 and R2 of another may be straight chain C16 alkyl. The former may constitute 30 to 40 wt %, such as 35 wt %, or less than 11 wt %, such as 1 to 10 wt %, of the mixture. The latter may constitute 60 to 70 wt %, such as 65 wt %, or more than 89 wt %, such as 90 to 99 wt %, of the mixture.

According to one embodiment, the hydrophobic substance may be a mixture of compounds of formula (I). In such a mixture, R1 may be straight chain C14 alkyl or straight chain C16 alkyl and R2 may be straight chain C14 alkyl or straight chain C16 alkyl. The ratio between the straight chain C14 alkyl and the straight chain C16 alkyl groups may be in the range from 5:95 to 4:6.

According to one embodiment, the hydrophobic substance may be AKD derived from stearic acid or palmitic acid, i.e. the products obtained upon condensation of two molecules of stearic acid or palmitic acid, or one molecule stearic acid and one molecule palmitic acid, with elimination of two molecules of water. Such AKD derivatives are readily available from commercial sources.

According to one embodiment, the hydrophobic substance may be a compound of formula (II)

(II)

R1 may be C12-22 alkyl or C12-22 fluoroalkyl. R3 may be selected from OH, NH2, OC1-8 alkyl, OC1-8 fluoroalkyl, NHC1-8 alkyl, NHC1-8 fluoroalkyl and OCH2CHR4CH2R5. R4 and R5 may be independently selected from O(CO)C13-23 alkyl, O(CO)C13-23 fluoroalkyl and O(CO)C13-23 alkenyl.

According to one embodiment, the hydrophobic substance may be a mixture of a compound of formula (I) and a compound of formula (II).

According to one embodiment, the hydrophobic substance may be a mixture of a compound of formula (I) and a compound of formula (II).

According to one embodiment, the hydrophilic solvent may have a boiling point in the range from 50 to 150° C., such as 65 to 100° C. Advantages of a hydrophilic solvents with a relatively high boiling point include the possibility to dissolve a relatively large amount of the hydrophobic compound in a relatively small volume of the hydrophilic solvent by heating the composition to a temperature slightly below the boiling point without the need for pressurized containers. The amount of solvent needed is thus minimized, which results in a minimized cost and environmental impact. Advantages of hydrophilic solvents with a relatively low boiling point include an effective vaporization of the solvent upon spraying of the composition of the invention towards a substrate. Hence, the solid residue constituting the super-rhydrophobic film, surface or material of the invention may be formed more rapidly as compared to the case when another solvent with a higher boiling point is used at the same temperature. The choice of solvent with a specific boiling point is dependent on e.g. the type of application and the temperature of the substrate, as well understood by the one skilled in the art. Other factors of importance for the choice of solvent include the level of acceptable toxicity and the time available for production of the superhydrophobic film, surface or material according to the invention in a specific application. The one skilled in the art is well capable of taking these and other factors into account to selecting a suitable solvent for a specific application. Even if the composition is heated to a temperature slightly above the boiling point in the method disclosed herein, whereby a container that withstands a slight positive pressure may be needed, this type of container is simpler and less expensive as compared to containers of the prior art that contains supercritical fluids.

According to one embodiment, the hydrophilic solvent may be an alcohol of the generic formula HOC1-8 alkyl, i.e. an aliphatic alcohol with 1 to 8 carbon atoms.

According to one embodiment, the hydrophilic solvent may be an alcohol that is fully miscible with water, such as methanol, ethanol, i-propanol and n-propanol. Advantages of using a hydrophilic solvent which is fully miscible with water include facile removal of condensed solvent residues near the treated substrate by simple cleaning with water. Another advantage includes the facile recycling of the hydrophobic substance in unused composition of the invention by addition of water until precipitation of the hydrophobic substance.

According to one embodiment, the hydrophilic solvent may be an alcohol that has a solubility in water which is greater than about 5 g/ml water, such as methanol, ethanol, i-propanol, n-propanol, 1-butanol and 2-butanol.

According to one embodiment, the hydrophilic solvent may have a capability to dissolve more than 100 mg/ml, such as more than 150, 200, 250 or 300 mg/ml, of the hydrophobic substance at a temperature near the boiling point (at atmospheric pressure) of the solvent, such as in a range from about 10° C. below the boiling point to about 10° C. above the boiling point. In the latter case, a container that withstands a slight positive pressure may be used to contain the composition when carrying out the method disclosed herein to prevent the solvent from boiling.

According to one embodiment, the solubility of the hydrophobic substance in the hydrophilic solvent may be less than 30 mg/ml, such as less than 20, 10, 5, 1, 0.5, 0.1 or 0.05 mg/ml, at the temperature of the substrate, e.g. from −30 to 30° C., such as 25° C., treated by the method disclosed herein. The solubility of the hydrophobic substance in the hydrophilic solvent may be more than 200 mg/ml, such as more than 250, 300 or 400 mg/ml, at a temperature within 10° C. from the boiling point of the hydrophilic solvent at atmospheric pressure, e.g. from 50 to 150° C., such as from 50 to 100° C. or from 50 to 60° C., e.g. 55° C. The use of a hydrophilic solvent to dissolve a hydrophobic substance according to the method disclosed herein maximizes the difference in solubility of the latter in the former as dependant on the temperature. For example, the solubility of the hydrophobic substance in the hydrophilic solvent may be less than 30 mg/ml at a temperature of 25° C. or less, and more than 200 mg/ml at a temperature of 55° C. or more. Advantageously, the solvent volume may thus be minimized by the method according to the invention. For example, use of supercritical $CO_2$ to dissolve AKD according to a method of the prior art typically requires more than 300 L of pressurized $CO_2$ to produce a superhydrophobic surface comprising 1 kg of AKD. In comparison, when using the method according to the invention, the volume of hydrophilic solvent, e.g. ethanol, needed to produce a comparable superhydrophobic film is less than 5 L.

According to one embodiment, 30 wt % or less, such as less than 25, 20, 15, 10, 5 or 3 wt %, of the hydrophobic substance of the composition of the invention may exist in a dissolved state at a temperature of the composition from less than −30 to 40° C., such as 15 to 30 or about 25° C. The other part of the hydrophobic substance may exist in a solid state without being dissolved in the hydrophilic solvent. For example, the hydrophobic substance may be fully dissolved in the hydrophilic solvent at a temperature of the composition which is in the range from e.g. 70 to 80° C. At the same time, less than 30 wt % of the hydrophobic substance may be dissolved at a temperature of the composition which is about 25° C. The composition of this example may be used in the method according to the invention. Hence, the hot (70 to 80° C.) composition, in which the hydrophobic substance is fully dissolved, may be sprayed towards a substrate which has a temperature of about 25° C., according to the method of the invention.

According to one embodiment, the melting point of the hydrophobic substance is at least 10° C., such as at least 15, 20, 25, 30, 40 or 50° C., higher than the temperature of the substrate, when carrying out the method of the invention.

According to one embodiment, 90 wt % or more, such as more than 95 or preferably 100 wt %, of the hydrophobic substance of the composition of the invention exists in a dissolved state at a temperature near the boiling point at ambient pressure of the hydrophilic solvent, such as in a range from about 10° C. below the boiling point to about 10° C. above the boiling point, such as a temperature of 40 to 100° C.

According to one embodiment, the hydrophilic solvent may consist of a mixture of two or more hydrophobic solvents mentioned in embodiments herein. The boiling point of the solvent may thus be tuned to be optimal for the particular application by e.g. formation of various azeotropic mixtures, as well known in the art. The properties of the hydrophilic solvent with regard to its ability to dissolve the hydrophobic substance at different temperatures may also by tuned by employment of such mixtures to be optimal for a particular application and hydrophobic substance, as well known in the art.

According to one embodiment, the composition may be used in the method disclosed herein at a temperature above the boiling point, such as 5 to 20° C. above the boiling point at atmospheric pressure, of the hydrophilic solvent. The composition may then be held in a container capable of withstanding a slight to medium positive pressure, as well known in the art. Advantageously, such positive pressure may be used to press the composition via e.g. a nozzle when spraying it towards the substrate without the need for other additional means, such as a pump, to accomplish a stream of spray of the composition.

According to one embodiment, the substrate and its immediate surrounding atmosphere may be at least 5° C. colder than the temperature of the composition when carrying out the method according to the invention. Hence, the difference between the temperature of the liquid composition of the invention and the temperature of the substrate may be at least 5° C. A typical temperature difference may be in the range from 30 to 100° C., such as 35 to 45° C. A substrate which is colder than the composition facilitates the deposition of the hydrophobic substance and thus the formation of a superhydrophobic film, surface or material.

According to one embodiment, the superhydrophobic film, surface or material produced by the method disclosed may have a density of less than 2 $g/cm^2$, such as less than 1, 0.5, 0.1, 0.05 or 0.01 $g/cm^2$, of the hydrophobic substance at the treated area of the substrate, i.e. at the area of the deposited residue comprising the hydrophobic substance.

According to one embodiment, the superhydrophobic film, surface or material produced by the method of the invention may display a contact angle in the range from 140 to 180°, such as from 150 to 180° or 155 to 180°, and a roll off angle in the range from 0.01 to 48°, such as from 1 to 10° or 1 to 5°.

According to one embodiment, the superhydrophobic film, surface or material produced by the method of the invention may display a contact angle in the range 100 to 180°, 110 to 180°, 120 to 180°, 130 to 180°, 140 to 180°, 150 to 180°, 160 to 180° or 170 to 180°.

According to one embodiment, the substrate treated by the method of the invention may be selected from the group consisting of paper, wood, cellulose, textile, metal, ceramic, glass, rubber, stone, marble, plastic, silica, carbon tape and paint.

According to one embodiment, the method disclosed herein may be used for making a paper or wood surface water repellant.

According to one embodiment, the composition of the invention may comprise an alcohol as the hydrophilic solvent of the formula HOC1-8 alkyl, such as methanol, ethanol, i-propanol, n-propanol or mixtures thereof, and AKD of formula (I), wherein R1 and R2 may be independently C14 or C16 straight chain alkyl, at a concentration of at least 1 mg/ml, at least 10 mg/ml, at least 50 mg/ml, at least 100 mg/ml or at least 200 mg/ml, such as at least 250 mg/ml. Such a composition may be useful for production of a superhydrophobic film, surface or material by the method of the invention. The composition may be heated to a suitable temperature, such as just below the boiling point of the solvent, to dissolve all of the AKD. The composition may then be sprayed by suitable means known in the art towards the substrate. Such means include, for example, commercially available spraying devices normally used for spray painting and containers with integrated nozzles well known in the art. A longer spraying time may be needed when the concentration of AKD in the composition is relatively low, such as 10 mg/ml, as compared to a relatively high concentration of AKD, such as 250 mg/ml, in order to obtain a comparable superhydrophobic film, surface or material.

According to one embodiment, substrates that may be treated by the method of the invention include, for example, electronic circuit boards, electronic devices, roofing tiles, outdoor wall panel (e.g. bricks, wood, painted wood), boat hull, various parts of aircrafts (e.g. the wings), clothes, shoes, boots and tents. The substrate may be made of, for example, paper, plastic, glass, metal, wood, cellulose, silica, carbon tape, textile or paint.

Although the present invention has been described above with reference to specific illustrative embodiments, it is not intended to be limited to the specific form set forth herein. Any combination of the above mentioned embodiments should be appreciated as being within the scope of the invention. Rather, the invention is limited only by the accompanying claims and other embodiments than the specific above are equally possible within the scope of these appended claims.

EXAMPLES

General Methods

All materials were obtained from commercial sources and were used without further purification unless otherwise noted. AKD granules (DR SF 300) comprising a mixture of >90% of C18-AKD and <10% of C16-AKD with a melting point of ~62° C., were obtained from EKA Chemicals (Bohus, Sweden).

Contact angles were measured to study the properties of the, by the method according to the invention or other methods for comparison, obtained hydrophobic film, surface or material with the aid of a semi-automatic CAM200 contact angle system (KSV Instruments Ltd., Helsinki, Finland). This system comprises a video camera which rapidly records live pictures of a water droplet over time. The volume of the water droplet for each measurement was kept at 5 µL. For each measurement, three individual spots of droplets were measured for three minutes. Contact angles were calculated from the generated images with the integrated software (CAM software) utilizing the Young-Laplace method.

Roll off angels were measured with a digital angle meter from MARKTOP® tools for domestic construction work. Flat planar substrates, treated by the method according to the invention or other methods for comparison, were attached to the digital angle meter by tape, adhesive on both sides. A 20 µl droplet was applied to the surface. The lever of the digital angle meter was then raised slowly until the droplet moved whereby the roll off angle was determined.

A hobby airbrush device for painting e.g. scaled model aircrafts was used for spraying.

Solutions of hydrophobic substances, e.g. AKD granules (DR SF 300), in various solvents were prepared by mixing the hydrophobic substance in the solvent at room temperature, followed by heating to ~74° C. for about 30 min.

Below follows non-limiting examples on the production of a superhydrophobic film, surface or material according the invention.

Example 1

Figure 1:
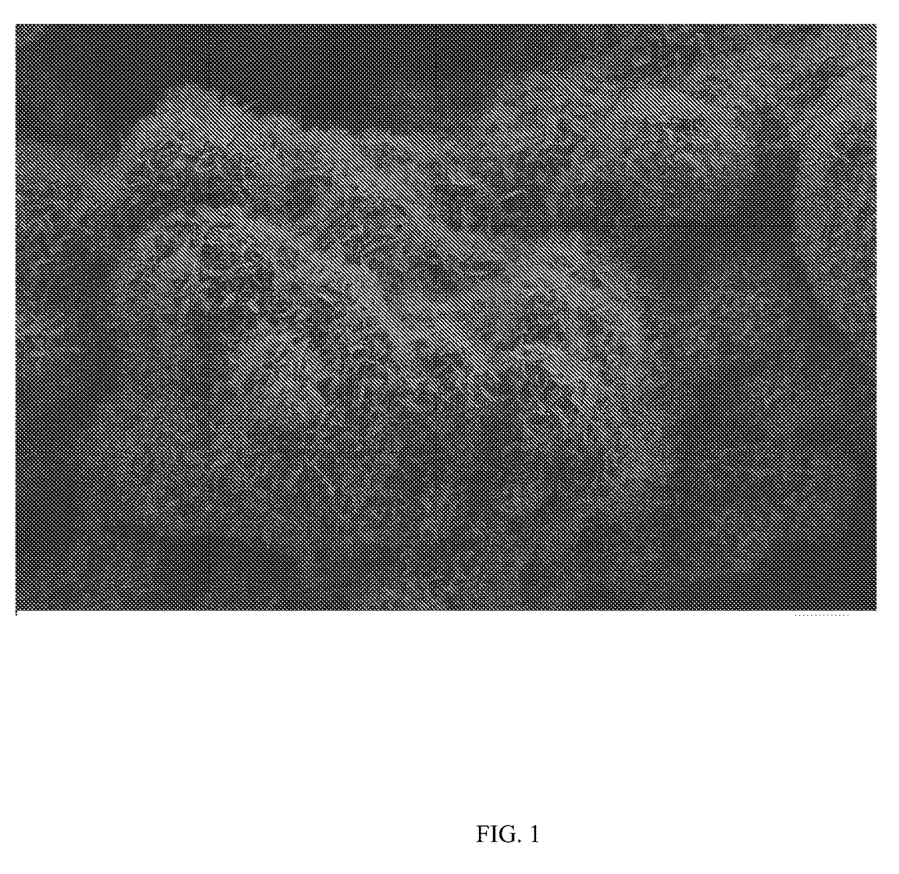
FIG. 1 is a SEM-image (2000 times enlargement) of the superhydrophobic surface obtained by spraying an ethanol solution of AKD on Whatman no. 1 filter paper as described in Example 1 herein below, clearly showing the deposited solid residue having a form of mountainous landscape with deep valleys and rounded peaks, according to an embodiment of the present invention.
Figure 2:
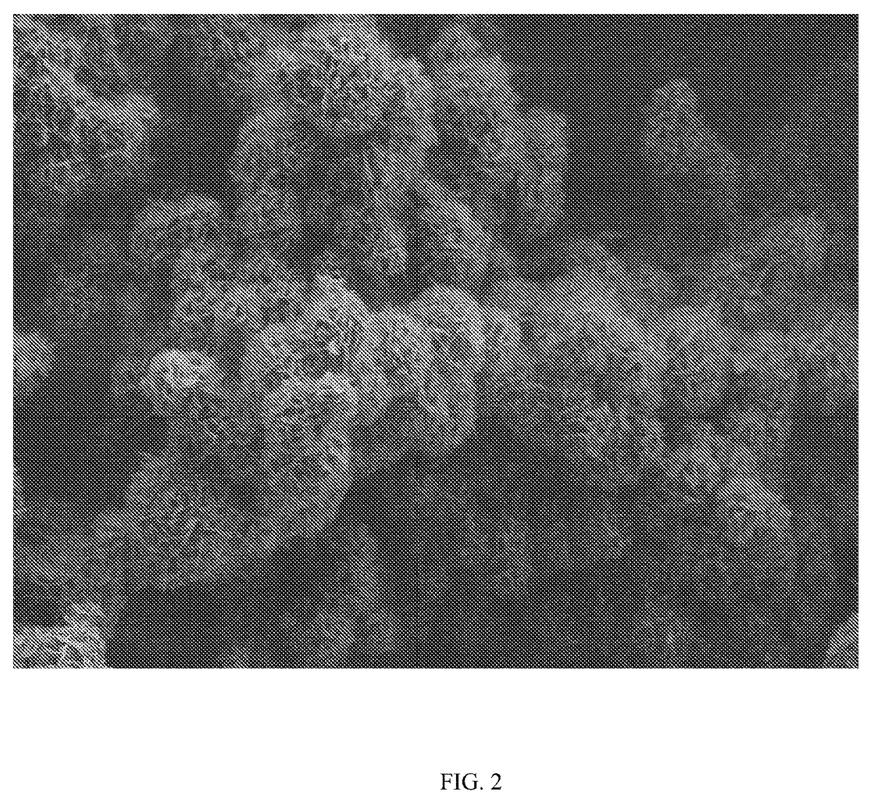
FIG. 2 is a SEM-image (2000 times enlargement) of the superhydrophobic surface obtained by spraying an i-propanol solution of AKD on Whatman no. 1 filter paper as described in Example 1 herein below, clearly showing the deposited solid residue having a form of mountainous landscape with deep valleys and rounded peaks, according to an embodiment of the present invention.
Figure 3:
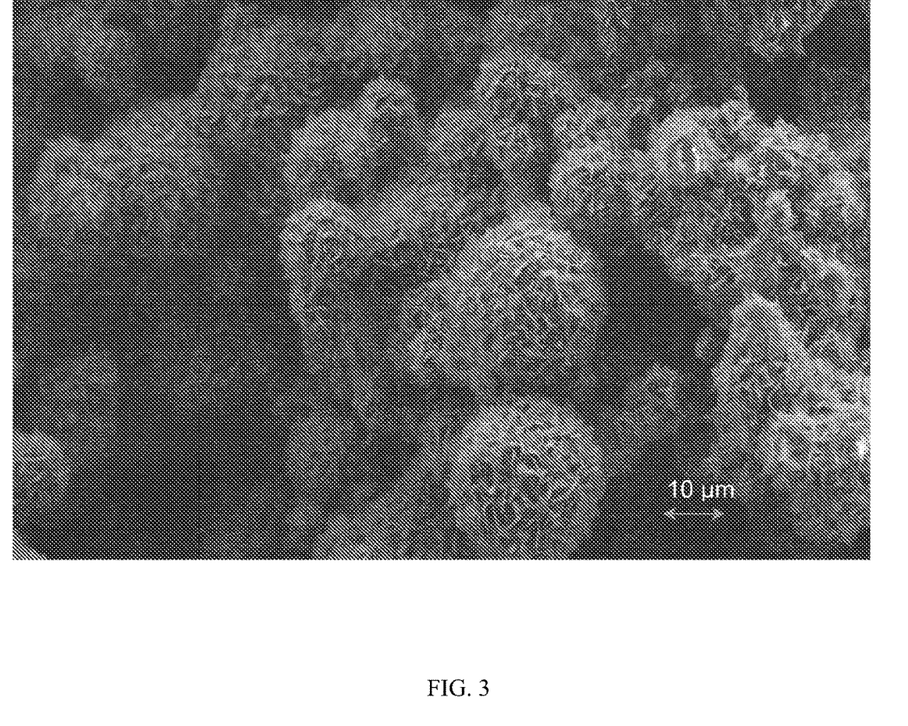
FIG. 3 is a SEM-image (2000 times enlargement) of the superhydrophobic surface obtained by spraying a methanol solution of AKD on Whatman no. 1 filter paper as described in Example 1 herein below, clearly showing the deposited solid residue having a form of mountainous landscape with deep valleys and rounded peaks, according to an embodiment of the present invention.
Figure 4:
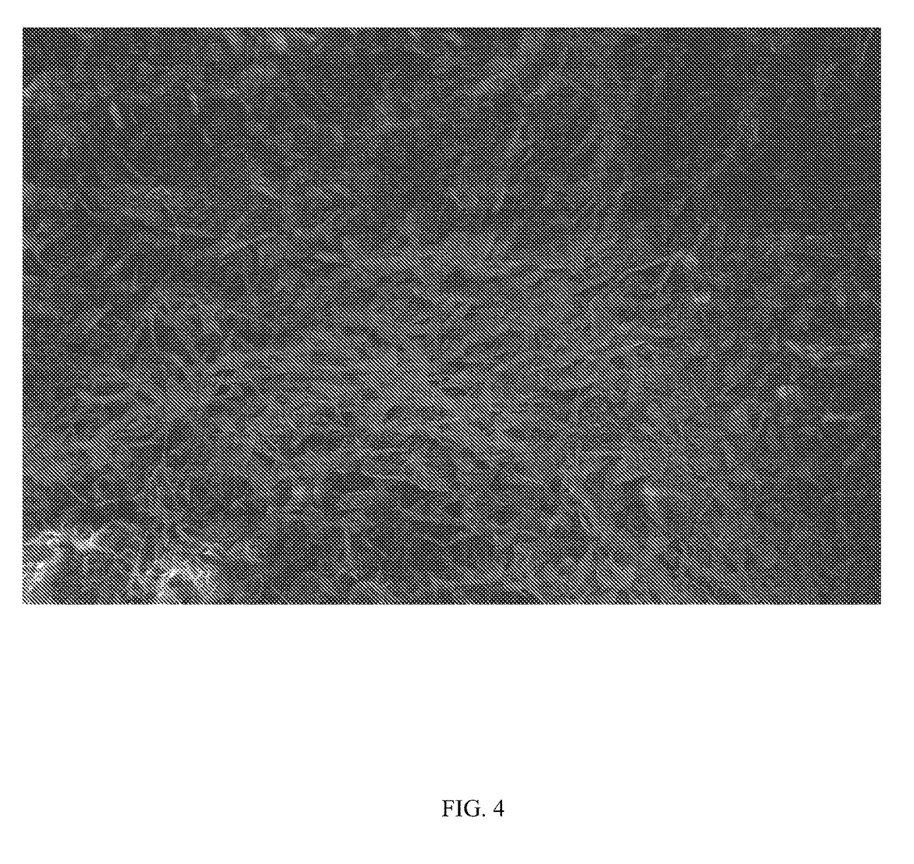
FIG. 4 is a SEM-image (2000 times enlargement) of the surface obtained by spraying a chloroform solution of AKD on Whatman no. 1 filter paper as described in Example 1 herein below, clearly differing in appearance in comparison to any of FIGS. 1 to 3 by being more similar to a flat landscape than a mountainous one.

Comparison Between the Use of Hydrophilic Solvents and Chloroform as an Example of a Hydrophobic Solvent A hot (~74° C.) solution (250 mg AKD/ml solvent), prepared as described above, of AKD granules (DR SF 300) in a hydrophilic or hydrophobic solvent were sprayed towards a substrate of Whatman 1 paper having a surface area of 104 cm². The spraying was done from a distance of about 30 cm from the paper surface for about 17 seconds. The stream of spray was moved over the paper in a way commonly employed for spray painting of surfaces, i.e. first in a continuous S-shaped movement from top to bottom, followed by the same type of movement from side to side. The substrate and its surrounding atmosphere had a temperature of about 25° C. Contact angles, roll off angels and the amount of AKD deposited on the substrate were measured for the use of various solvents as depicted in the table below:

| Solvent | Contact angle (°) | Roll off angle (°) | Amount deposited AKD (mg) |
|---|---|---|---|
| Chloroform | 151.7 | 48.075 | 572.3 |
| Methanol (kept in a sealed container) | 159.8 | 3.95 | 537.3 |
| Ethanol | 162.4 | 4.575 | 538.5 |
| i-Propanol | 164.9 | 2.375 | 545.6 |

Example 2

Treatment of Various Substrates by the Method According to the Invention

A hot (~74° C.) solution (250 mg AKD/ml ethanol), prepared as described above, of AKD granules (DR SF 300) in ethanol was sprayed towards various substrates until the surface was covered by a deposit of AKD as determined visually. Additional experimental conditions used were the same as those used in example 1. Contact angles and roll off angles were measured for the various treated substrates as depicted in the table below:

| Substrate | Contact angle (°) | Roll off angle (°) |
|---|---|---|
| Glass (Microscope Slides) | 165.6 | 4.175 |
| Aluminium sheet | 157 | 6.4 |
| Rough aluminium sheet surface (made rough with a P120 sand paper) | 168 | 5.05 |
| Polypropylene surface | 152.1 | 2.725 |
| Rough polypropylene surface | 162.9 | 2.725 |
| Polyethylene surface (Hard plastic surface) | | |
| Polyethylene surface (Hard plastic surface) | 155.3 | 2 |

-continued

| Substrate | Contact angle (°) | Roll off angle (°) |
|---|---|---|
| Rough polyethylene surface (Hard plastic surface) (made rough with a P120 sand paper) | 158.2 | 3.5 |
| Sawn timber (Pine; rough surface) | 145.4 | 4.45 |
| Wood veneer (Birch; smooth surface) | 164 | 4.725 |
| Natural rubber (Smooth surface; back side of IKEA Patrull, shower mat) | 156.6 | 4.1 |
| Natural rubber (rough surface; the front side of IKEA Patrull, shower mat) | 156 | 7.8 |
| Corrugated fibreboard (Smooth surface) | 155.2 | 2.05 |

In the claims, the term "comprises/comprising" does not exclude the presence of other species or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality.

The invention claimed is:

1. A method for the production of a superhydrophobic film, or surface on a substrate comprising the steps of:
   (i) providing a composition comprising a hydrophobic substance and a hydrophilic solvent, said hydrophilic solvent being a liquid at a temperature of 25° C. and atmospheric pressure; and
   (ii) spraying said composition towards the substrate for deposition of a solid residue onto the surface of said substrate for generation of said superhydrophobic film, or surface;
   wherein
   the temperature of said composition is 30 to 100° C. higher than the temperature of said substrate and the temperature of the substrate is at least 10° C. lower than the melting point of the hydrophobic substance when carrying out step (ii).

2. The method according to claim 1, wherein said hydrophobic substance is a compound of formula (I) or (II), or a mixture of a compound of formula (I) and a compound of formula (II),
wherein
R1 and R2 are independently selected from C12-22 alkyl and C12-22 fluoroalkyl; and
R3 is selected from OH, NH2, OC1-8 alkyl, OC1-8 fluoroalkyl, NHC1-8 alkyl, NHC1-8 fluoroalkyl and OCH2CHR4CH2R5, said R4 and R5 being independently selected from O(CO)C13-23 alkyl, O(CO)C13-23 fluoroalkyl and O(CO)C13-23 alkenyl.

3. The method according to claim 1, wherein said hydrophobic substance is alkylketenedimer derived from stearic acid, palmitic acid or a mixture of stearic acid and palmitic acid.

4. The method according to claim 1, wherein said hydrophilic solvent has a boiling point in the range of 50 to 150° C.

5. The method according to claim 1, wherein said hydrophilic solvent is HOC1-8 alkyl.

6. The method according to claim 5, wherein said hydrophilic solvent is methanol, ethanol, i-propanol, or any mixture thereof.

7. The method according to claim 1, wherein
at least 10% of said hydrophobic substance exists in a solid state when said composition is kept at a temperature of 25° C. or less for at least 1 h; and
at least 90% of said hydrophobic substance is dissolved in said hydrophilic solvent when said composition is kept at a temperature of 55° C. or more for at least 1 h.

8. The method according to claim 1, wherein the solubility of said hydrophobic substance in said hydrophilic solvent is less than 30 mg/ml at a temperature of 25° C. or less, and more than 200 mg/ml at a temperature of 55° C. or more.

9. The method according to claim 1, wherein said substrate is selected from the group consisting of paper, wood, cellulose, textile, metal, ceramic, glass, rubber, stone, marble, plastic, silica, carbon tape and paint.

10. The method according to claim 1, wherein the temperature of said composition is from 70 to 80° C. during step (ii).

11. The method according to claim 10, wherein the temperature of the substrate is at least 30° C. lower than the melting point of the hydrophobic substance during step (ii).

12. The method according to claim 1, wherein the temperature of the solvent is such that it completely dissolves the hydrophobic substance during step (ii), and wherein less than 30 wt. % of the hydrophobic substance is dissolved in the solvent when the solvent is at the temperature of the substrate during step (ii).

13. The method according to claim 1, wherein the hydrophobic substance and the hydrophilic solvent, respectively, and the amounts thereof are selected in a manner such that at least 90 wt. % of the total amount of the hydrophobic substance is dissolved at a temperature within 10° C. of the boiling point of the solvent, and wherein less than 30 wt. % of the total amount of the hydrophobic substance is dissolved at a temperature of the composition of about 25° C.

* * * * *

UNITED STATES PATENT AND TRADEMARK OFFICE
CERTIFICATE OF CORRECTION

PATENT NO. : 9,700,915 B2  
APPLICATION NO. : 13/993924  
DATED : July 11, 2017  
INVENTOR(S) : Marcus Ruda Page 1 of 1

It is certified that error appears in the above-identified patent and that said Letters Patent is hereby corrected as shown below:

In the Specification

Column 3,
Line 38, "*n*-butyl, butyl, *sec*-butyl" should read --*n*-butyl, *i*-butyl, *sec*-butyl--.

Signed and Sealed this
Twenty-seventh Day of March, 2018

Andrei Iancu
*Director of the United States Patent and Trademark Office*